United States Patent
Zheng et al.

(10) Patent No.: US 12,556,456 B2
(45) Date of Patent: Feb. 17, 2026

(54) COMMUNICATION METHOD AND RELATED APPARATUS

(71) Applicant: HUAWEI TECHNOLOGIES CO., LTD., Guangdong (CN)

(72) Inventors: Juan Zheng, Nanjing (CN); Xubao Zhang, Dongguan (CN); Zhong Chen, Beijing (CN); Ting Liao, Nanjing (CN); Qing Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 387 days.

(21) Appl. No.: 18/175,402

(22) Filed: Feb. 27, 2023

(65) Prior Publication Data
US 2023/0208722 A1    Jun. 29, 2023

Related U.S. Application Data

(63) Continuation of application No. PCT/CN2021/107008, filed on Jul. 19, 2021.

(30) Foreign Application Priority Data

Aug. 26, 2020    (CN) .......................... 202010870809.5

(51) Int. Cl.
*H04L 41/122*      (2022.01)

(52) U.S. Cl.
CPC ................................. *H04L 41/122* (2022.05)

(58) Field of Classification Search
CPC ............. H04L 41/0895; H04L 41/0897; H04L 41/0816; H04L 67/10; H04L 41/0806; H04L 41/122; H04L 12/4633; H04W 16/10
See application file for complete search history.

(56) References Cited

U.S. PATENT DOCUMENTS 10,757,576 B2 *   8/2020   Ashrafi ............... H04L 41/0895

FOREIGN PATENT DOCUMENTS

| CN | 110012475 A | 7/2019 |
| CN | 111049859 A | 4/2020 |
| CN | 111224802 A | 6/2020 |

(Continued)

OTHER PUBLICATIONS

S2-173135, Huawei et al., TS 23.501: Network topology consideration, 3GPP TSG SA WG2 Meeting #121, May 15 19, 2017, Hangzhou, China, 11 pages.

*Primary Examiner* — Mahran Y Abu Roumi (57) ABSTRACT

A method includes: A first network device obtains first link layer topology information corresponding to a first network slice; the first network device obtains second link layer topology information corresponding to a second network slice; the first network device determines, based on the first link layer topology information and the second link layer topology information, that a link layer topology of the second network slice is included in a link layer topology of the first network slice; the first network device receives network layer topology information that is of the first network slice and that is sent by a second network device; and the first network device determines network layer topology information of the second network slice based on the second link layer topology information and the network layer topology information of the first network slice.

20 Claims, 5 Drawing Sheets

(56) References Cited

FOREIGN PATENT DOCUMENTS

| | | |
|---|---|---|
| JP | 2015126355 A | 7/2015 |
| JP | 2016127322 A | 7/2016 |
| WO | 2020001044 A1 | 1/2020 |
| WO | WO-2020164229 A1 * | 8/2020 ........... H04L 41/122 |

* cited by examiner

COMMUNICATION METHOD AND RELATED APPARATUS

CROSS-REFERENCE TO RELATED APPLICATIONS

This application is a continuation of International Application No. PCT/CN2021/107008, filed on Jul. 19, 2021, which claims priority to Chinese Patent Application No. 202010870809.5, filed on Aug. 26, 2020. The disclosures of the aforementioned applications are hereby incorporated by reference in their entireties.

TECHNICAL FIELD

This disclosure relates to the field of communication technologies, and in particular, to a communication method and a related apparatus.

BACKGROUND

Network slice technologies are being developed and proposed for a fifth-generation mobile communication (the 5th generation mobile communication, 5G) technology network standard network A network slice refers to a division of a physical network into a plurality of virtual networks. Each virtual network may be further divided based on different service requirements (for example, may be divided based on a latency requirement, a broadband size requirement, and a security requirement in an actual case), to flexibly deal with different network application scenarios. The network slice has broad application in industry application.

In an existing network slice deployment solution, when fine-granularity slicing is performed on one physical interface, the physical interface needs to be divided into logical interfaces corresponding to a plurality of network slices. In addition, each logical interface needs to be configured with a corresponding interior gateway protocol (Interior Gateway Protocol, IGP), to form network layer topology information of each network slice.

Because each network slice in a network needs to be separately configured with the IGP to form the network layer topology information, a large quantity of routes used by a network device to advertise the network layer topology information can have large resource costs for the network device.

SUMMARY

This disclosure provides a communication method and a related apparatus. When a first network device determines, based on obtained link layer topology information, that a topology of a second network slice is included in a topology of a first network slice, the first network device may determine network layer topology information of the second network slice based on link layer topology information of the second network slice and network layer topology information of the first network slice, that is, network layer topology information of one network slice is multiplexed on a plurality of network slices, so that a quantity of routes used by a network device to advertise the network layer topology information can be reduced, and resource costs can be reduced.

According to a first aspect of this disclosure, a communication method is provided, including: A first network device obtains first link layer topology information corresponding to a first network slice; the first network device obtains second link layer topology information corresponding to a second network slice, where the first network device may, for example, obtain the first link layer topology information and the second link layer topology information by receiving a Netconf message sent by another network device; the first network device determines, based on the first link layer topology information and the second link layer topology information, that a link layer topology of the second network slice is included in a link layer topology of the first network slice, that is, the link layer topology of the first network slice includes the entire link layer topology of the second network slice; the first network device receives network layer topology information that is of the first network slice and that is sent by a second network device; and the first network device determines network layer topology information of the second network slice based on the second link layer topology information and the network layer topology information of the first network slice.

In some possible designs, when the first network device determines, based on the obtained link layer topology information, that the topology of the second network slice is included in the topology of the first network slice, the first network device may determine the network layer topology information of the second network slice based on the link layer topology information of the second network slice and the network layer topology information of the first network slice, that is, network layer topology information of one network slice is multiplexed on a plurality of network slices, so that a quantity of routes used by a network device to advertise the network layer topology information can be reduced, and resource costs can be reduced.

In some possible designs, the method further includes: The first network device computes a tunnel path on the second network slice based on the network layer topology information of the second network slice, that is, the network layer topology information of the second network slice may be used by the first network device to compute the tunnel path on the second network slice.

In some possible designs, that the first network device determines, based on the first link layer topology information and the second link layer topology information, that a link layer topology of the second network slice is included in a link layer topology of the first network slice includes: When M interfaces of a second link layer topology and M interfaces of a first link layer topology are separately located on M physical interfaces, the first network device may determine that the link layer topology of the second network slice is included in the link layer topology of the first network slice, where a quantity of all interfaces of the second link layer topology is M, a quantity of all interfaces of the first link layer topology is N, M is less than or equal to N, and M and N are positive integers. That is, each of the M interfaces of the second link layer topology and one of the M interfaces of the first link layer topology are located on a same physical interface. In other words, each of the M physical interfaces includes one interface of the second link layer topology and one interface of the first link layer topology.

In some possible designs, whether one link layer topology is included in another link layer topology is determined by determining whether interfaces of the two link layer topologies are located on a same physical interface. This improves flexibility of a solution implementation.

In some possible designs, that the first network device determines network layer topology information of the second network slice based on the second link layer topology information and the network layer topology information of the first network slice includes: The first network device determines the first link layer topology when the first network device determines, based on the second link layer topology information, that the link layer topology of the second network slice is a part of topology in the link layer topology of the first network slice, where the first link layer topology is a topology that is in the link layer topology of the first network slice and that is the same as the link layer topology of the second network slice; and the first network device determines the network layer topology information of the second network slice based on the first link layer topology and the network layer topology information of the first network slice, where the network layer topology information of the second network slice is a part that is in the network layer topology information of the first network slice and that corresponds to the first link layer topology.

That is, when the link layer topology of the second network slice is the same as the link layer topology of the first network slice, the first network device may directly multiplex the network layer topology information of the first network slice based on the second link layer topology information of the second network slice, to obtain the network layer topology information of the second network slice.

When the link layer topology of the second network slice is a part of topology in the link layer topology of the first network slice, the first network device may first determine a part that is in the link layer topology of the first network slice and that is the same as the link layer topology of the second network slice, and then determine, based on this part of topology, the network layer topology information that is to be multiplexed on the second network slice, to obtain the network layer topology information of the second network slice.

In some possible designs, the network layer topology information that is to be multiplexed on the second network slice is determined in a targeted manner in different cases. This improves flexibility of a solution implementation.

In some possible designs, before the first network device determines the network layer topology information of the second network slice based on the second link layer topology information and the network layer topology information of the first network slice, the method further includes: The first network device obtains third link layer topology information corresponding to a third network slice; the first network device determines, based on the third link layer topology information and the second link layer topology information, that the link layer topology of the second network slice is included in a link layer topology of the third network slice; the first network device receives network layer topology information that is of the third network slice and that is sent by the second network device; and the first network device determines, based on the network layer topology information of the third network slice and the network layer topology information of the first network slice, to use the network layer topology information of the first network slice to determine the network layer topology information of the second network slice.

That is, when the first network device determines that the link layer topology of the second network slice is included in the link layer topology of the first network slice and the link layer topology of the third network slice, the first network device may select network layer topology information of one network slice from the network layer topology information of the first network slice and the network layer topology information of the third network slice. Then, the first network device may determine the network layer topology information of the second network slice based on the second link layer topology information of the second network slice and the selected network layer topology information of the network slice.

In some possible designs, the network layer topology information that is of the first network slice and that is received by the first network device may include topology information determined based on a shortest path algorithm and one or more pieces of topology information determined based on FlexAlgo. Before determining a network layer topology of the second network slice, the first network device may first select one piece of network layer topology information from the received network layer topology information of the first network slice, for example, select the topology information determined based on the shortest path algorithm or the topology information determined based on the flexible algorithm FlexAlgo. Then, the first network device determines the network layer topology information of the second network slice based on the selected network layer topology information of the first network slice.

In some possible designs, the network layer topology information of the second network slice includes interior gateway protocol IGP topology information, and the IGP topology information includes one or more items of the following: an IP address, a link cost, a cost value, a latency, a traffic engineering metric (Traffic Engineering metric, TE metric), an affinity attribute, and a shared risk link group (Shared Risk Link Group, SRLG). In this solution, the network layer topology information further includes an IP address. An IP address of one network slice is multiplexed on a plurality of other network slices. This can reduce IP address allocation, and save an IP address resource.

In some possible designs, the first link layer topology information further includes one or more of an identifier of the first network slice and bandwidth information of the first network slice; and the second link layer topology information further includes one or more of an identifier of the second network slice and bandwidth information of the second network slice.

In some possible designs, the method further includes: The first network device obtains a path computation requirement of the second network slice; the first network device performs path computation based on the second link layer topology information and the network layer topology information of the second network slice, to obtain a path computation result; and the first network device sends the path computation result to the second network device, where the path computation result is used to indicate the second network device to create a tunnel that carries a service.

In some possible designs, the path computation result includes one or more items of the following: a path computation result of a resource reservation protocol RSVP tunnel, a path computation result of a segment routing traffic engineering SR TE tunnel, and a path computation result of a segment routing Internet protocol version 6 SRv6 tunnel.

According to a second aspect of this disclosure, a network device is provided, including: an obtaining unit, a processing unit, and a receiving unit, where the obtaining unit is configured to obtain first link layer topology information corresponding to a first network slice; the obtaining unit is further configured to obtain second link layer topology information corresponding to a second network slice; the processing unit is configured to determine, based on the first link layer topology information and the second link layer topology information, that a link layer topology of the second network slice is included in a link layer topology of the first network slice; the receiving unit is configured to receive network layer topology information that is of the first network slice and that is sent by a second network device; and the processing unit is further configured to determine network layer topology information of the second network slice based on the second link layer topology information and the network layer topology information of the first network slice.

In some possible designs, the processing unit is further configured to compute a tunnel path on the second network slice based on the network layer topology information of the second network slice.

In some possible designs, the processing unit is further configured to: when M interfaces of a second link layer topology and M interfaces of a first link layer topology are separately located on M physical interfaces, determine that the link layer topology of the second network slice is included in the link layer topology of the first network slice, where a quantity of all interfaces of the second link layer topology is M, a quantity of all interfaces of the first link layer topology is N, M is less than or equal to N, and M and N are positive integers.

In some possible designs, the processing unit is further configured to: determine the first link layer topology when it is determined, based on the second link layer topology information, that the link layer topology of the second network slice is a part of topology in the link layer topology of the first network slice, where the first link layer topology is a topology that is in the link layer topology of the first network slice and that is the same as the link layer topology of the second network slice; and determine the network layer topology information of the second network slice based on the first link layer topology and the network layer topology information of the first network slice, where the network layer topology information of the second network slice is a part that is in the network layer topology information of the first network slice and that corresponds to the first link layer topology.

In some possible designs, the obtaining unit is further configured to obtain third link layer topology information corresponding to a third network slice; the processing unit is further configured to determine, based on the third link layer topology information and the second link layer topology information, that the link layer topology of the second network slice is included in a link layer topology of the third network slice; the receiving unit is further configured to receive network layer topology information that is of the third network slice and that is sent by the second network device; and the processing unit is further configured to determine, based on the network layer topology information of the third network slice and the network layer topology information of the first network slice, to use the network layer topology information of the first network slice to determine the network layer topology information of the second network slice.

In some possible designs, the network layer topology information of the first network slice includes topology information determined based on a shortest path algorithm or topology information determined based on FlexAlgo.

In some possible designs, the network layer topology information of the second network slice includes interior gateway protocol IGP topology information, and the IGP topology information includes one or more items of the following: an IP address, a link cost, a cost value, a latency, a TE metric, an affinity attribute, and an SRLG.

In some possible designs, the first link layer topology information further includes one or more of an identifier of the first network slice and bandwidth information of the first network slice; and the second link layer topology information further includes one or more of an identifier of the second network slice and bandwidth information of the second network slice.

In some possible designs, the network device further includes a sending unit; the obtaining unit is further configured to obtain a path computation requirement of the second network slice; the processing unit is further configured to perform path computation based on the second link layer topology information and the network layer topology information of the second network slice, to obtain a path computation result; and the sending unit is further configured to send the path computation result to the second network device, where the path computation result is used to indicate the second network device to create a tunnel that carries a service.

In some possible designs, the path computation result includes one or more items of the following: a path computation result of an RSVP tunnel, a path computation result of an SR TE tunnel, and a path computation result of an SRv6 tunnel.

According to a third aspect of this disclosure, a network device is provided. The network device includes a processor and a memory, where the memory is configured to store instructions; and the processor is configured to execute the instructions in the memory, to enable the network device to perform the method according to any item of the first aspect.

According to a fourth aspect of this disclosure, a computer storage medium is provided. The computer storage medium may be non-volatile. The computer storage medium stores computer-readable instructions, and when the computer-readable instructions are executed by a processor, the method according to any item of the first aspect is implemented.

According to a fifth aspect of this disclosure, a computer program product including instructions is provided, where when the computer program product runs on a computer, the computer is enabled to perform the method according to any item of the first aspect.

It can be learned from the foregoing technical solutions that embodiments of this disclosure have the following advantages:

This disclosure provides the communication method and the related apparatus. When the first network device determines, based on the obtained link layer topology information, that the topology of the second network slice is included in the topology of the first network slice, the first network device may determine the network layer topology information of the second network slice based on the link layer topology information of the second network slice and the network layer topology information of the first network slice, that is, network layer topology information of one network slice is multiplexed on a plurality of network slices, so that a quantity of routes used by a network device to advertise the network layer topology information can be reduced, and resource costs can be reduced.

DESCRIPTION OF EMBODIMENTS

To make the objectives, technical solutions, and advantages of this disclosure clearer, the following describes embodiments of this disclosure with reference to accompanying drawings. Apparently, the described embodiments are merely some rather than all of embodiments of this disclosure. A person of ordinary skill in the art may know that with emergence of a new application scenario, the technical solutions provided in embodiments of this disclosure are equally applicable to similar technical problems.

In the specification, claims, and accompanying drawings of this disclosure, the terms "first", "second", and so on are intended to distinguish between similar objects but do not necessarily indicate a specific order or sequence. It should be understood that the data used in such a way are interchangeable in appropriate circumstances, so that embodiments described herein can be implemented in an order other than the content illustrated or described herein. Moreover, terms "include", "comprise", and any other variant thereof are intended to cover non-exclusive inclusion. For example, a process, a method, a system, a product, or a device that includes a series of steps or modules is not necessarily limited to those expressly listed steps or modules, but may include other steps or modules not expressly listed or inherent to the process, the method, the product, or the device. Names or numbers of steps in this disclosure do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Unit division appears in this disclosure is logical division. In an actual application, there may be another division manner in an implementation, for example, a plurality of units may be combined into or integrated into another system, or some features may be ignored or may not be performed. In addition, displayed or discussed mutual coupling, direct coupling, or communication connection may be implemented through some interfaces, and indirect coupling or communication connection between units may be implemented in an electrical form or another similar form. This is not limited in this disclosure. In addition, a unit or subunit described as a separate part may or may not be physically separated, may or may not be a physical unit, or may be distributed to a plurality of circuit units. Some or all units may be selected based on an actual requirement to implement an objective of a solution in this disclosure.

In a 5G network, diversified service requirements have different requirements on the network in aspects such as a speed, performance, security, reliability, and a latency. For example, an enhanced mobile broadband (enhanced mobile broadband, eMBB) scenario (for example, a virtual reality scenario or an augmented reality scenario) has a high requirement on a bandwidth, and needs a bandwidth of an xGbps level. For another example, a massive machine type communication (massive machine type communication, mMTC) scenario (for example, a wearable scenario or a smart grid scenario) needs to support access of massive devices, for example, needs to support access of hundreds of millions or billions of devices. For another example, an ultra-reliable and low latency (ultrareliable and low latency communications, uRLLC) scenario (for example, a self-driving scenario, a remote surgery scenario, or an industrial control scenario) needs to support an ultra-low latency of 1 ms. In the face of different scenarios, different requirements, and an ultimate experience requirement, a network slice emerges at a right time, and may be used to flexibly construct networks with different features based on different scenarios and requirements.

The network slice is a logical network customized on a physical or virtual network infrastructure based on different service requirements. The network slice may be a complete end-to-end network that includes an access network, a transmission network, a core network, and an application server, can provide a complete communication service, and has a specific network capability. The network slice may alternatively be any combination of an access network, a transmission network, a core network, and an application server.

The network slice may be usually used in a 5G network, and the 5G network may implement one network multi-use by using the network slice, to meet requirements of service-level agreements (Service-Level Agreement, SLA) of different services. One network slice usually provides a type of network with same service requirement assurance. Such a network structure allows an operator to provide a network as a service to a user, and can freely combine physical networks based on indicators such as a rate, a capacity, coverage, a latency, reliability, security, and availability, to meet requirements of different users.

In an existing network slice deployment solution, when fine-granularity slicing is performed on one physical interface, the physical interface needs to be divided into logical interfaces corresponding to a plurality of network slices. In addition, each logical interface needs to be configured with a corresponding IGP to form network layer topology information of each network slice.

Because each network slice in a network needs to be separately configured with the IGP to form the network layer topology information, a network device needs to advertise the network layer topology information on each network slice. Because an IGP message is advertised as a multicast protocol, when the network layer topology information on each network slice needs to be advertised, a large quantity of routes used to advertise the network layer topology information cause large resource costs of the network device.

In view of this, embodiments of this disclosure provide a communication method. When a first network device determines, based on obtained link layer topology information, that a link layer topology of a second network slice is included in a link layer topology of a first network slice, the network device may determine network layer topology information of the second network slice based on link layer topology information of the second network slice and network layer topology information of the first network slice, that is, network layer topology information of one network slice is multiplexed on a plurality of network slices, so that a quantity of routes used by a network device to advertise the network layer topology information can be reduced, and resource costs can be reduced.

Figure 1:
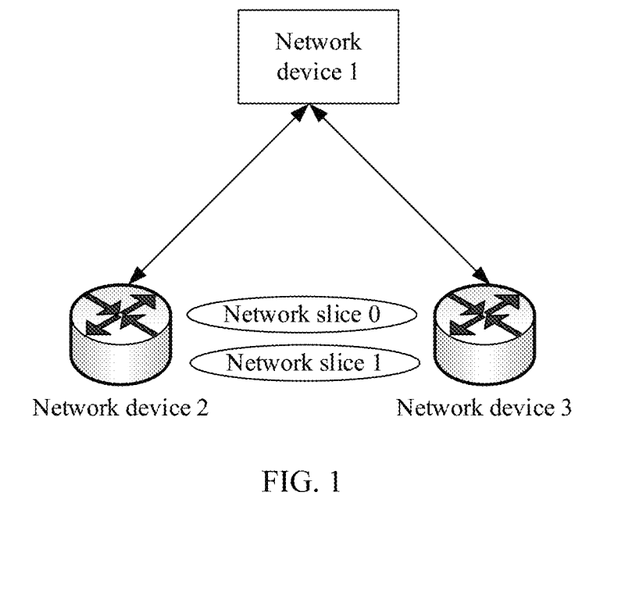
FIG. 1 is a schematic diagram of an application architecture of a communication method according to an embodiment of this disclosure.

FIG. 1 is a schematic diagram of an application architecture of a communication method according to an embodiment of this disclosure. As shown in FIG. 1, the application architecture includes a network device 1, a network device 2, and a network device 3. The network device 1 is separately connected to the network device 2 and the network device 3, and the network device 2 is connected to the network device 3. A network slice 0 and a network slice 1 are deployed on the network device 2 and the network device 3, and a topology of the network slice 1 is included in a topology of the network slice 0. The network device 1 may receive link layer topology information that is of each of the network slice 0 and the network slice 1 and that is sent by the network device 2, and determine, based on the link layer topology information, that the topology of the network slice 1 is included in the topology of the network slice 0. In this way, when the network device 1 obtains network layer topology information of the network slice 0, the network device 1 may determine network layer topology information of the network slice 1 based on the link layer topology information of the network slice 1 and the network layer topology information of the network slice 0.

It may be understood that the network device 1 may be a controller that has a centralized management function in a subnet, and can manage the network device 2 and the network device 3. For example, the centralized management function may be a network slice subnet management function (Network Slice Subnet Management Function, NSSMF). The network device 2 and the network device 3 each may be a physical device that can implement traffic forwarding (namely, a forwarder), for example, a switch, a router, or a gateway, or may be a virtual device that supports traffic forwarding.

Figure 2:
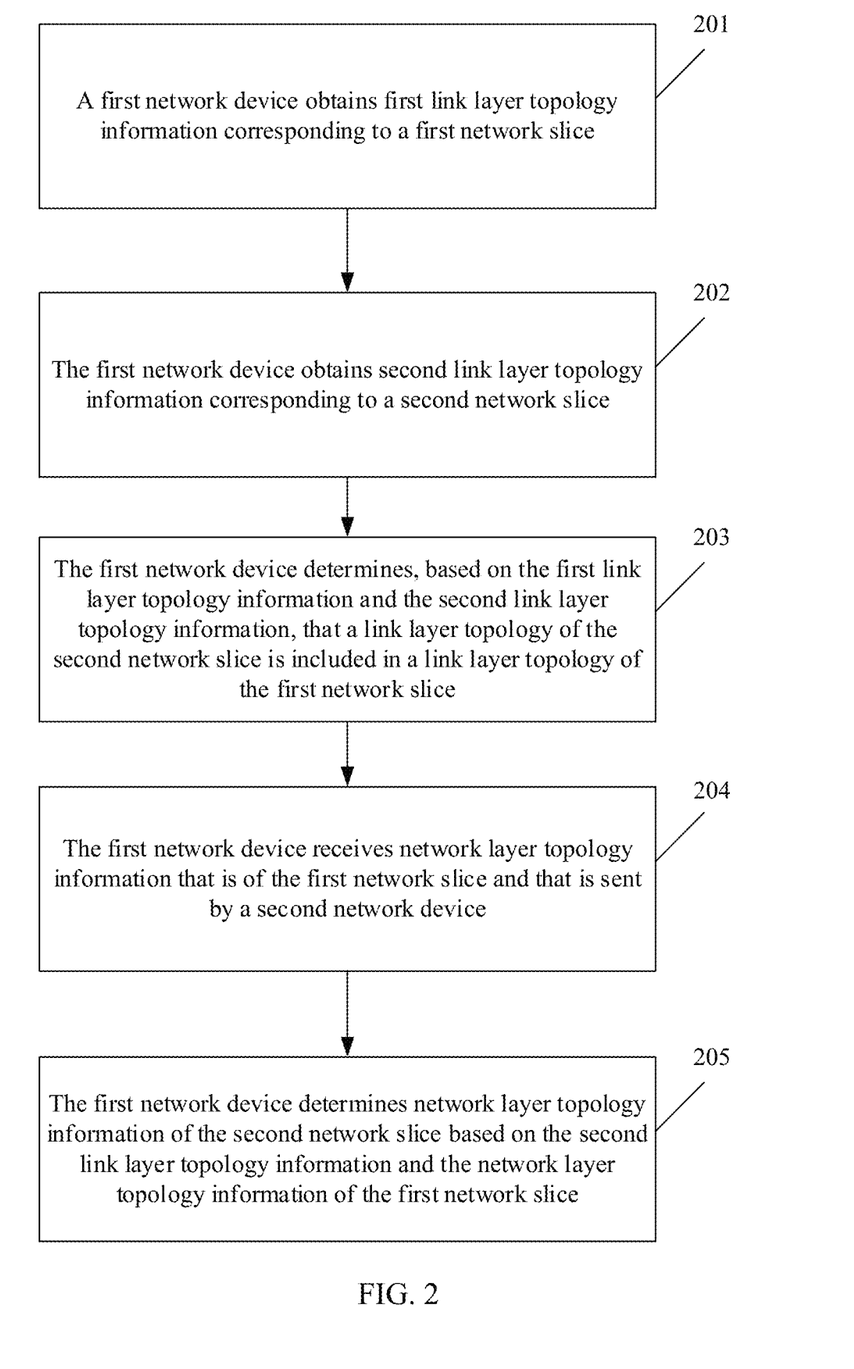
FIG. 2 is a schematic flowchart of a communication method 200 according to an embodiment of this disclosure.

FIG. 2 is a schematic flowchart of a communication method 200 according to an embodiment of this disclosure. As shown in FIG. 2, the communication method 200 provided in this embodiment of this disclosure includes the following steps:

Step 201: A first network device obtains first link layer topology information corresponding to a first network slice.

In this embodiment, the first network device may obtain, by receiving a message sent by a second network device, the first link layer topology information corresponding to the first network slice. For example, a Netconf protocol may be enabled on the second network device. After obtaining the first link layer topology information corresponding to the first network slice, the second network device may send, to the first network device by using a Netconf message, the first link layer topology information corresponding to the first network slice.

In a possible embodiment, the first network slice may include one or more network devices, and the second network device may be one network device in the first network slice. The second network device may obtain, by enabling a link layer discovery protocol (Link Layer Discovery Protocol, LLDP), the first link layer topology information corresponding to the first network slice. The LLDP provides a standard link layer discovery manner, and information such as a primary capability, a management address, a device identifier, and an interface identifier of a local device may be encapsulated into an LLDP packet, to transfer the information to a neighboring device. After receiving the information, the neighboring device may store the information, so that a network management system (Network Management System, NMS) queries and determines a communication status of a link. Link layer topology information in a network, for example, interfaces attached to a device in the network and specific information of a mutual connection between devices, can be obtained based on the LLDP.

For example, the first link layer topology information obtained by the second network device based on the LLDP may include information such as N interface identifiers corresponding to the first network slice, an identifier of the first network slice, and a bandwidth of the first network slice. The N interface identifiers may be identifiers of interfaces through which the one or more network devices in the first network slice communicate with the neighboring device of the one or more network devices, and N may be an integer greater than or equal to 1.

In this embodiment, the first network device may be a controller that has a centralized management function in a subnet, and can manage the second network device. The second network device may be a physical device that can implement traffic forwarding (namely, a forwarder), for example, a switch, a router, or a gateway, or may be a virtual device that supports traffic forwarding.

Step 202: The first network device obtains second link layer topology information corresponding to a second network slice.

In this embodiment, the first network device may obtain, by receiving a message sent by the second network device, for example, a Netconf message sent by the second network device, the second link layer topology information corresponding to the second network slice. It may be understood that the first network device may alternatively obtain, by receiving a message sent by another network device, the second link layer topology information corresponding to the second network slice.

The second network slice may also include one or more network devices, and the second network device may be one network device in the second network slice. A manner in which the second network device obtains the second link layer topology information corresponding to the second network slice is similar to a manner in which the second network device obtains the first link layer topology information. For details, refer to the step 201. Details are not described herein again.

For example, the second link layer topology information may include information such as M interface identifiers corresponding to the second network slice, an identifier of the second network slice, and a bandwidth of the second network slice. The M interface identifiers may be identifiers of interfaces through which the network devices in the second network slice communicate with neighboring devices of the network devices, and M may be an integer greater than or equal to 1.

Step 203: The first network device determines, based on the first link layer topology information and the second link layer topology information, that a link layer topology of the second network slice is included in a link layer topology of the first network slice.

In this embodiment, that the link layer topology of the second network slice is included in the link layer topology of the first network slice may be that the link layer topology of the first network slice includes the link layer topology of the second network slice. For example, the link layer topology of the first network slice is the same as the link layer topology of the second network slice (that is, the link layer topology of the first network slice exactly includes the link layer topology of the second network slice), or the link layer topology of the second network slice is a part of the link layer topology of the first network slice (that is, the link layer topology of the first network slice further includes another topology in addition to the link layer topology of the second network slice).

Figure 3:
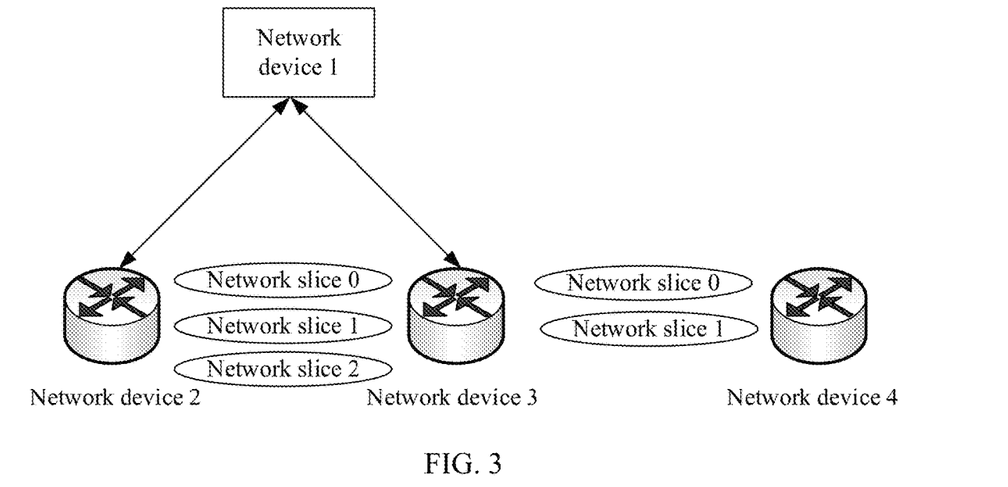
FIG. 3 is a schematic diagram of an application architecture of another communication method according to an embodiment of this disclosure.

For example, FIG. 3 is a schematic diagram of an application architecture of another communication method according to an embodiment of this application. As shown in FIG. 3:

A network slice 0 includes a network device 2, a network device 3, and a network device 4.

A network slice 1 includes a network device 2, a network device 3, and a network device 4.

A network slice 2 includes a network device 2 and a network device 3.

That is, a topology corresponding to the network slice 0 is "network device 2—network device 3—network device 4", and a topology corresponding to the network slice 1 is "network device 2—network device 3—network device 4"; and a topology corresponding to the network slice 2 is "network device 2—network device 3".

The topology of the network slice 1 is the same as the topology of the network slice 0, and the topology of the network slice 1 may be considered as being included in the topology of the network slice 0. The topology of the network slice 0 includes the topology of the network slice 2, and further includes the topology of "network device 3—network device 4". The topology of the network slice 2 may also be considered as being included in the topology of the network slice 0.

It may be understood that, that the link layer topology of the second network slice is included in the link layer topology of the first network slice is that the link layer topology of the first network slice includes the entire topology of the second network slice. If the first network slice includes only a part of the topology of the second network slice, it may be considered as that the link layer topology of the second network slice is not included in the link layer topology of the first network slice.

For example, it is assumed that the network slice 0 includes a network device 2, a network device 3, and a network device 4, and the network slice 3 includes a network device 3, a network device 4, and a network device 5. That is, a topology corresponding to the network slice 0 is "network device 2—network device 3—network device 4", and a topology corresponding to the network slice 3 is "network device 3—network device 4—network device 5". The topology of the network slice 0 includes only a part of the topology of the network slice 3 (namely, "network device 3—network device 4"), and does not include the other part of the topology of the network slice 3 (namely, "network device 4—network device 5"). Therefore, it may be considered as that the topology of the network slice 3 is not included in the topology of the network slice 0.

In a possible embodiment, the first network device may determine, by comparing interface identifiers in the link layer topology information, whether the link layer topology of the second network slice is included in the link layer topology of the first network slice.

For example, when M interfaces of a second link layer topology and M interfaces of a first link layer topology are separately located on M physical interfaces, the first network device may determine that the link layer topology of the second network slice is included in the link layer topology of the first network slice, where a quantity of all interfaces of the second link layer topology is M, a quantity of all interfaces of the first link layer topology is N, M is less than or equal to N, and M and N are positive integers.

It may be understood that, that M interfaces of a second link layer topology and M interfaces of a first link layer topology are separately located on M physical interfaces may refer to that each of the M interfaces of the second link layer topology and one of the M interfaces of the first link layer topology are located on a same physical interface. In other words, each of the M physical interfaces includes one interface of the second link layer topology and one interface of the first link layer topology.

Specifically, whether the interface of the second link layer topology and the interface of the first link layer topology are located on a same physical interface may be determined based on an interface identifier in the second link layer topology information and an interface identifier in the first link layer topology information. For example, it is assumed that one interface identifier 1 in the first link layer topology information is 1/0/0, and one interface identifier 2 in the second link layer topology information is 1/0/0.1, then it may be considered as that an interface corresponding to the interface identifier 2 is a sub-interface of an interface corresponding to the interface identifier 1, and both the interfaces are located on a same physical interface. For another example, it is assumed that one interface identifier 3 in the first link layer topology information is 1/0/0.2, and one interface identifier 4 in the second link layer topology information is 1/0/0.3, then it may be considered as that both an interface corresponding to the interface identifier 3 and an interface corresponding to the interface identifier 4 are sub-interfaces under a same physical interface, and both the interfaces are also located on a same physical interface.

Figure 4:
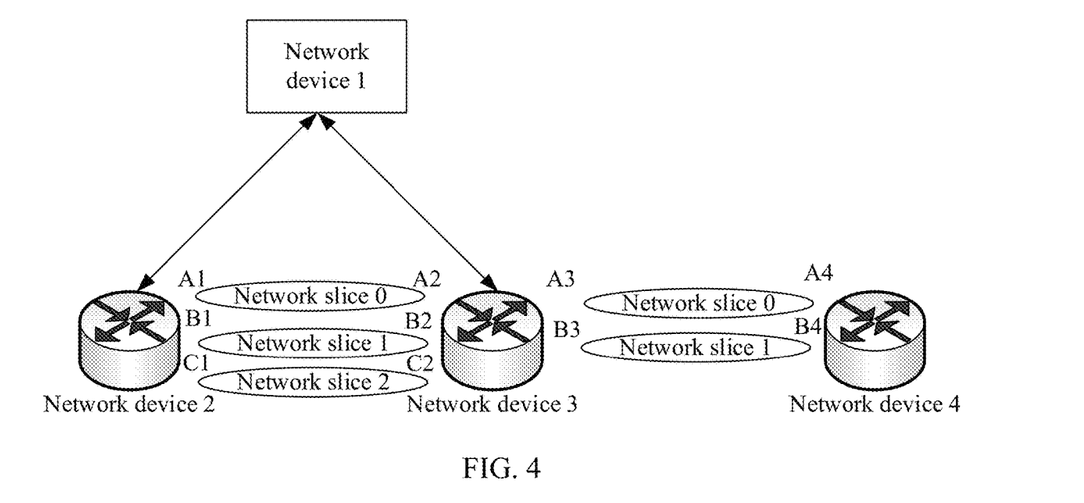
FIG. 4 is a schematic diagram of an application architecture of another communication method according to an embodiment of this disclosure.

For example, FIG. 4 is a schematic diagram of an application architecture of another communication method according to an embodiment of this disclosure. As shown in FIG. 4, a link layer topology of a network slice 0 includes four interfaces, which are respectively A1, A2, A3, and A4; a link layer topology of a network slice 1 includes four interfaces, which are respectively B1, B2, B3, and B4; and a link layer topology of a network slice 2 includes two interfaces, which are respectively C1 and C2.

Interface identifiers corresponding to the interfaces in the network slice 0, the network slice 1, and the network slice 2 may be shown in Table 1:

TABLE 1

| Network slice 0 | A1 | A2 | A3 | A4 |
|---|---|---|---|---|
|  | 1/0/0 | 1/1/0.1 | 1/2/0 | 1/3/0.2 |
| Network slice 1 | B1 | B2 | B3 | B4 |
|  | 1/0/0.1 | 1/1/0.2 | 1/2/0.2 | 1/3/0.1 |
| Network slice 2 | C1 | C2 |  |  |
|  | 1/0/0.2 | 1/1/0.3 |  |  |

It can be learned from Table 1 that, for the network slice 0 and the network slice 1, the interfaces A1 to A4 and the interfaces B1 to B4 are separately located on four physical interfaces. In other words, the four interfaces in the network slice 0 and the four interfaces in the network slice 1 are located on four physical interfaces. In this way, it can be determined that the link layer topology of the network slice 1 is included in the link layer topology of the network slice 0.

For the network slice 0 and the network slice 2, the interface A1 and the interface C1 are located on a same physical interface, and the interface A2 and the interface C2 are located on a same physical interface. In other words, the two interfaces in the network slice 0 and the two interfaces in the network slice 2 are located on two physical interfaces. In this way, it can be determined that the link layer topology of the network slice 2 is included in the link layer topology of the network slice 0.

Figure 5:
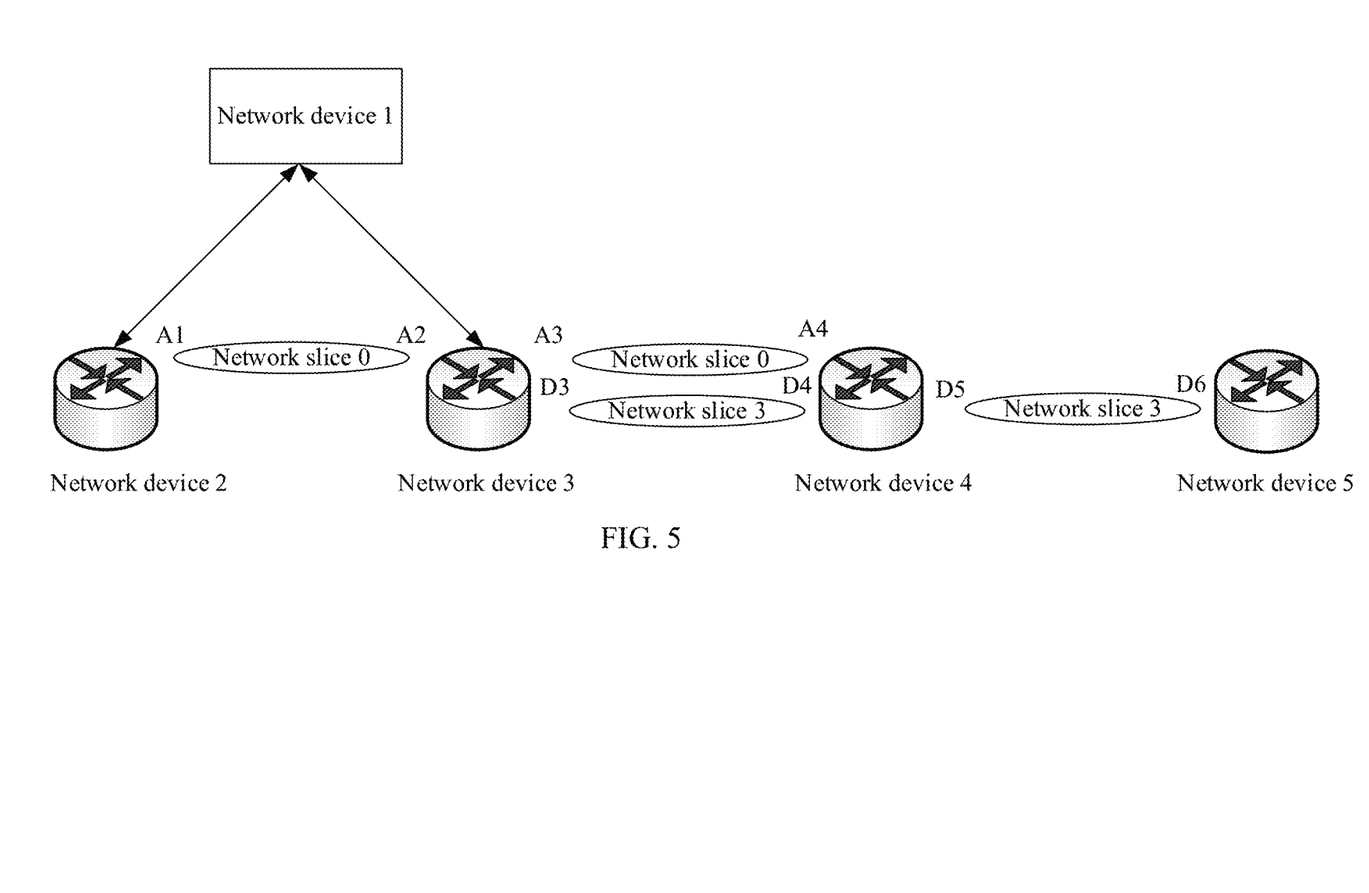
FIG. 5 is a schematic diagram of an application architecture of another communication method according to an embodiment of this disclosure.

For example, FIG. 5 is a schematic diagram of an application architecture of another communication method according to an embodiment of this disclosure. As shown in FIG. 5, a link layer topology of a network slice 0 includes four interfaces, which are respectively A1, A2, A3, and A4; and a link layer topology of a network slice 3 includes four interfaces, which are respectively D3, D4, D5, and D6.

Interface identifiers corresponding to the interfaces in the network slice 0 and the network slice 3 may be shown in Table 2:

TABLE 2

| Network slice 0 | A1 1/0/0 | A2 1/1/0.1 | A3 1/2/0 | A4 1/3/0.2 | | |
|---|---|---|---|---|---|---|
| Network slice 3 | | | D3 1/2/0.4 | D4 1/3/0.4 | D5 1/4/0 | D6 1/5/0.2 |

It can be learned from Table 2 that only the interfaces D3 and D4 in the network slice 3 are located on same physical interfaces as the interfaces A3 and A4 in the network slice 0, and the interfaces D5 and D6 in the network slice 3 and the interfaces A1 and A2 in the network slice 0 are respectively located on different physical interfaces. In other words, the four interfaces in the network slice 3 and the four interfaces in the network slice 0 are not located on four physical interfaces. In this case, it can be determined that the link layer topology of the network slice 3 is not included in the link layer topology of the network slice 0.

Step 204: The first network device receives network layer topology information that is of the first network slice and that is sent by the second network device.

In this embodiment, the network layer topology information of the first network slice may be Internet protocol (Internet Protocol, IP) layer topology information, which may also be referred to as layer-3 topology information. The network layer topology information may be, for example, IGP topology information. The IGP topology information of the first network slice is obtained by enabling the IGP on the first network slice. For example, each network device on the first network slice may advertise each other corresponding network layer topology information of each network device by using an IGP message. In this way, the network layer topology information of each network device under the first network slice, namely, the network layer topology information corresponding to the first network slice, may be obtained on the second network device. The IGP enabled on the first network slice may include an intermediate system to intermediate system (Intermediate System to Intermediate System, IS-IS) protocol or an open shortest path first (Open Shortest Path First, OSPF) protocol. Both the protocols are link state-based protocols.

After the second network device obtains the network layer topology information of the first network slice, the second network device may send the network layer topology information of the first network slice to the first network device by using a border gateway protocol-link state (Border Gateway Protocol-Link state, BGP-LS). The BGP-LS is a manner of collecting a network topology, and can be used to summarize topology information collected based on the IGP, to send the topology information to an upper controller.

For example, the network layer topology information of the first network slice may include one or more items of the following: an IP address, a link cost, a cost value, a latency, a traffic engineering metric (Traffic Engineering metric, TE metric), an affinity attribute, and a shared risk link group (Shared Risk Link Group, SRLG).

It may be understood that the first link layer topology information, the second link layer topology information, and the network layer topology information that are received by the first network device may be sent by a same network device (for example, the second network device), or may be sent by different network devices, for example, a third network device sends the first link layer topology information and the second link layer topology information to the first network device, and the second network device sends the network layer topology information to the first network device. A network device from which the first network device obtains the link layer topology information and the network layer topology information is not specifically limited in this embodiment.

Step 205: The first network device determines network layer topology information of the second network slice based on the second link layer topology information and the network layer topology information of the first network slice.

In this embodiment, because the link layer topology of the second network slice is included in the link layer topology of the first network slice, a network layer attribute (for example, attribute information such as a link cost value, a latency, and a TE metric) of the second network slice is similar to that of the first network slice, and the second network slice may multiplex the network layer topology information of the first network slice.

For example, when the link layer topology of the second network slice is the same as the link layer topology of the first network slice, the first network device may multiplex the network layer topology information of the first network slice based on the second link layer topology information of the second network slice, to obtain the network layer topology information of the second network slice.

The first network device may first determine the first link layer topology when the link layer topology of the second network slice is a part of topology in the link layer topology of the first network slice, where the first link layer topology is a topology that is in the link layer topology of the first network slice and that is the same as the link layer topology of the second network slice; and the first network device determines the network layer topology information of the second network slice based on the first link layer topology and the network layer topology information of the first network slice, where the network layer topology information of the second network slice is a part that is in the network layer topology information of the first network slice and that corresponds to the first link layer topology. In brief, the first network device may first determine the part that is in the link layer topology of the first network slice and that is the same as the link layer topology of the second network slice, and then determine, based on this part of the topology, the network layer topology information that is to be multiplexed on the second network slice, to obtain the network layer topology information of the second network slice.

When the first network device determines, based on the obtained link layer topology information, that the link layer topology of the second network slice is included in the link layer topology of the first network slice, the network device may determine the network layer topology information of the second network slice based on the link layer topology information of the second network slice and the network layer topology information of the first network slice, that is, network layer topology information of one network slice is multiplexed on a plurality of network slices, so that a quantity of routes used by a network device to advertise the network layer topology information can be reduced, and resource costs can be reduced. In addition, when the network layer topology information further includes an IP address, an IP address of one network slice is multiplexed on a plurality of other network slices. This can further reduce IP address allocation, and save an IP address resource.

In a possible embodiment, the first network device may overlay the second link layer topology information and the network layer topology information of the first network slice based on the link layer topology of the second network slice, to obtain global topology information of the second network slice. Specifically, for a network device in the second network slice, link layer topology information of the second network slice on the network device and network layer topology information of the first network slice on the network device may be overlaid, to obtain network layer topology information of the second network slice on the network device.

For ease of understanding, the following describes, by using a specific example, in detail a process in which the first network device determines the network layer topology information of the second network slice.

The network structure shown in FIG. 3 is still used as an example. The network device 1 may obtain link layer topology information of the network slice 0, link layer topology information of the network slice 1, and network layer topology information of the network slice 0 by receiving a message sent by the network device 2. The link layer topology information of the network slice 1 is shown in Table 3:

TABLE 3

|  | Interface identifier | Network slice identifier | Network slice bandwidth |
| --- | --- | --- | --- |
| Network device 2 | 1/0/0.1 | 1 | 1 megabit/second (Mb/s) |
| Network device 3 | 1/1/0.1, 1/2/0.1 | 1 | 1 Mb/s |
| Network device 4 | 1/3/0.1 | 1 | 1 Mb/s |

The network layer topology information of the network slice 0 is shown in Table 4:

TABLE 4

|  | IP address | Link cost value | Latency |
| --- | --- | --- | --- |
| Network device 2 | 1.1.1.1 | 2 | 10 ms |
| Network device 3 | 2.2.2.2 | 2 | 10 ms |
| Network device 4 | 3.3.3.3 | 2 | 10 ms |

Because the link layer topology of the network slice 0 is the same as the link layer topology of the network slice 1, a network layer topology of the network slice 1 may be obtained by directly reusing a network layer topology of the network slice 0. In other words, the network layer topology of the network slice 1 is the same as the network layer topology of the network slice 0.

In addition, the network device 1 overlays the network layer topology information of the network slice 0 based on the link layer topology information of the network slice 1, to obtain global topology information of the network slice 1. Specifically, the global topology information of the network slice 1 is shown in Table 5:

TABLE 5

|  | Interface identifier | Network slice identifier | Network slice bandwidth | IP address | Link cost value | Latency |
| --- | --- | --- | --- | --- | --- | --- |
| Network device 2 | 1/0/0.1 | 1 | 1 Mb/s | 1.1.1.1 | 2 | 10 ms |
| Network device 3 | 1/1/0.1, 1/2/0.1 | 1 | 1 Mb/s | 2.2.2.2 | 2 | 10 ms |
| Network device 4 | 1/3/0.1 | 1 | 1 Mb/s | 3.3.3.3 | 2 | 10 ms |

It can be learned from Table 5 that the first network device overlays the network layer topology information of the network slice 0 based on the link layer topology information of the network slice 1, to obtain the global topology information of the network slice 1.

In addition, the network device 1 may further obtain link layer topology information of the network slice 2 by receiving a message sent by the network device 2. The link layer topology information of the network slice 2 is shown in Table 6:

TABLE 6

|  | Interface identifier | Network slice identifier | Network slice bandwidth |
| --- | --- | --- | --- |
| Network device 2 | 1/0/0.2 | 2 | 2 Mb/s |
| Network device 3 | 1/1/0.2 | 2 | 2 Mb/s |

The network device 1 may determine, based on the link layer topology of the network slice 2, a part (namely, the network device 2 and the network device 3) that is in the network slice 1 and that is the same as the link layer topology of the network slice 2, to determine a network layer topology of the network slice 2.

Specifically, network layer topology information of the network slice 2 is shown in Table 7:

TABLE 7

|  | IP address | Link cost value | Latency |
| --- | --- | --- | --- |
| Network device 2 | 1.1.1.1 | 2 | 10 ms |
| Network device 3 | 2.2.2.2 | 2 | 10 ms |

Corresponding network layer topology information on the network slice 0 is overlaid based on the link layer topology information of the network slice 2, to obtain global topology information of the network slice 2. Specifically, the network layer topology information of the network slice 2 is shown in Table 8:

TABLE 8

|  | Interface identifier | Network slice identifier | Network slice bandwidth | IP address | Link cost value | Latency |
| --- | --- | --- | --- | --- | --- | --- |
| Network device 2 | 1/0/0.2 | 2 | 2 Mb/s | 1.1.1.1 | 2 | 10 ms |
| Network device 3 | 1/1/0.2 | 2 | 2 Mb/s | 2.2.2.2 | 2 | 10 ms |

In a possible embodiment, in addition to configuring corresponding network layer topology information on the first network slice by enabling the IGP, corresponding network layer topology information may be further configured on another network slice, and the link layer topology of the second network slice is also included in a link layer topology of the another network slice. In this way, for the second network slice, the first network device may select any network slice from the first network slice and the another network slice, and multiplex the network layer topology information of the selected network slice.

For example, the communication method 200 provided in this embodiment may further include: Before the first network device determines the network layer topology information of the second network slice based on the second link layer topology information and the network layer topology information of the first network slice, the method further includes: The first network device obtains third link layer topology information corresponding to a third network slice; the first network device determines, based on the third link layer topology information and the second link layer topology information, that the link layer topology of the second network slice is included in a link layer topology of the third network slice; the first network device receives network layer topology information that is of the third network slice and that is sent by the second network device; and the first network device determines, based on the network layer topology information of the third network slice and the network layer topology information of the first network slice, to use the network layer topology information of the first network slice to determine the network layer topology information of the second network slice.

That is, when the first network device determines that the link layer topology of the second network slice is included in the link layer topology of the first network slice and the link layer topology of the third network slice, the first network device may select network layer topology information of one network slice from the network layer topology information of the first network slice and the network layer topology information of the third network slice. Then, the first network device may determine the network layer topology information of the second network slice based on the second link layer topology information of the second network slice and the selected network layer topology information of the network slice.

In a possible embodiment, when one or more flexible algorithms (FlexAlgo) are configured on a same network slice, the network slice may be configured based on a conventional network layer topology and based on the one or more FlexAlgos to obtain one or more FlexAlgo topologies. In other words, the network slice may include conventional network layer topology information and one or more pieces of FlexAlgo topology information. In this case, another network slice that is not configured with a network layer topology may select to multiplex the network layer topology information corresponding to the network slice or one piece of the FlexAlgo topology information. The conventional network layer topology information may be, for example, topology information determined based on a shortest path algorithm.

That is, the network layer topology information that is of the first network slice and that is received by the first network device may include topology information determined based on the shortest path algorithm and one or more pieces of topology information determined based on the FlexAlgo. Before determining a network layer topology of the second network slice, the first network device may first select one piece of network layer topology information from the received network layer topology information of the first network slice, for example, select the topology information determined based on the shortest path algorithm or the topology information determined based on the flexible algorithm FlexAlgo. Then, the first network device determines the network layer topology information of the second network slice based on the selected network layer topology information of the first network slice.

For example, when two algorithms FlexAlgo 1 and FlexAlgo 2 are configured on the network slice 0, the network slice 0 may generate shortest path algorithm-based topology information 0, FlexAlgo 1-based topology information 1, and FlexAlgo 2-based topology information 2. That is, the network layer topology information that corresponds to the network slice 0 and that is received by the first network device includes the topology information 0, the topology information 1, and the topology information 2. The first network device may select any piece of topology information from the topology information 0, the topology information 1, and the topology information 2 to determine the network layer topology information of the network slice 1.

It may be understood that in this embodiment, after the first network device determines the network layer topology information of the second network slice, the first network device may compute a tunnel path on the second network slice based on the network layer topology information of the second network slice.

For example, the communication method 200 provided in this embodiment may further include: The first network device obtains a path computation requirement of the second network slice; the first network device performs path computation based on the second link layer topology information and the network layer topology information of the second network slice, to obtain a path computation result; and the first network device sends the path computation result to the second network device, where the path computation result is used to indicate the second network device to create a tunnel that carries a service.

In a possible embodiment, the path computation result may include one or more items of the following: a path computation result of a resource reservation protocol (Resource ReSerVation Protocol, RSVP) tunnel, a path computation result of a segment routing traffic engineering (Segment Routing Traffic Engineering, SR TE) tunnel, and a path computation result of a segment routing Internet protocol version 6 (Segment Routing Internet Protocol Version 6, SRv6) tunnel. In other words, the communication method 200 provided in this embodiment may be applied to different networks, to obtain different types of tunnels through computation based on the network layer topology information of the second network slice.

For example, when the communication method 200 in this embodiment is applied to an IPv4 network, RSVP tunnel path computation may be performed based on the network layer topology information of the second network slice, to obtain a path computation result of an RSVP tunnel; or SR TE tunnel path computation is performed based on the network layer topology information of the second network slice, to obtain a path computation result of an SR TE tunnel. When the communication method 200 in this embodiment is applied to an IPv6 network, SRv6 tunnel path computation may be performed based on the network layer topology information of the second network slice, to obtain a path computation result of an SRv6 tunnel.

Figure 6:
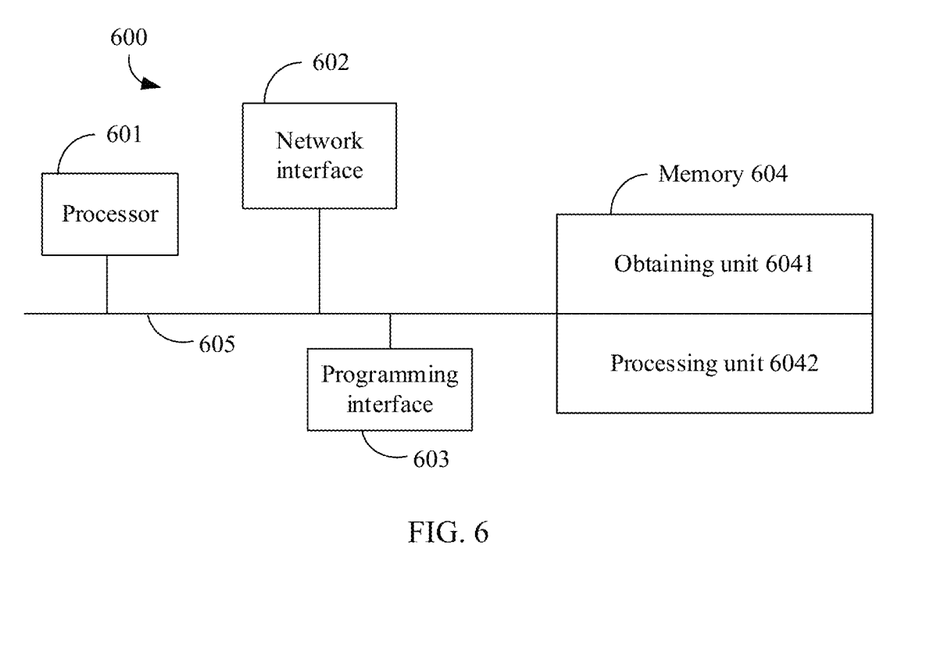
FIG. 6 is a schematic diagram of a structure of a network device 600 according to an embodiment of this disclosure.

To implement the foregoing embodiment, this disclosure further provides a network device. FIG. 6 is a schematic diagram of a structure of a network device 600 according to an embodiment of this disclosure.

Although some specific features are shown in the network device 600 shown in FIG. 6, a person skilled in the art realizes from embodiments of this disclosure that FIG. 6 does not show various other features for brevity, to avoid confusion with more related aspects of implementations disclosed in embodiments of this disclosure. In view of this, as an example, in some implementations, the network device 600 includes one or more processors 601, for example, a central processing unit (CPU), a network interface 602, a programming interface 603, a memory 604, and one or more communication buses 605, configured to interconnect various components. In some other implementations, some functional components or units may alternatively be omitted from or added to the network device 600 based on the foregoing example.

In some implementations, the network interface 602 may be a fixed network interface, for example, an RJ45 interface, or may be a wireless network interface, for example, a Wi-Fi interface or a cellular network interface.

In some implementations, the programming interface 603 may be a physical interface, for example, a programmable serial interface or a programmable parallel interface, or may be a virtual interface, for example, an application programming interface.

In some implementations, in addition to another usage, the network interface 602 is configured to connect to one or more other network devices/servers in a network system. In some implementations, the communication bus 605 includes a circuit for interconnecting system components and controlling communication between the system components. The memory 604 may include a non-volatile memory, for example, a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The memory 604 may alternatively include a volatile memory. The volatile memory may be a random access memory (random access memory, RAM), and is used as an external cache.

In some implementations, the memory 604 or a non-temporary computer-readable storage medium of the memory 604 stores the following programs, modules, and data structures, or a subset thereof, specifically including a receiving unit (not shown in the figure), a sending unit (not shown in the figure), an obtaining unit 6041, and a processing unit 6042.

In a possible embodiment, the network device 600 may include, for example, an obtaining unit 6041, a processing unit 6042, and a receiving unit. The obtaining unit 6041 is configured to obtain first link layer topology information corresponding to a first network slice; the obtaining unit 6041 is further configured to obtain second link layer topology information corresponding to a second network slice; the processing unit 6042 is configured to determine, based on the first link layer topology information and the second link layer topology information, that a link layer topology of the second network slice is included in a link layer topology of the first network slice; the receiving unit is configured to receive network layer topology information that is of the first network slice and that is sent by a second network device; and the processing unit 6042 is further configured to determine network layer topology information of the second network slice based on the second link layer topology information and the network layer topology information of the first network slice. The obtaining unit 6041 and the processing unit 6042 are computer-executable programs stored in the memory 604, and functions or capabilities of the obtaining unit 6041 and the processing unit 6042 are implemented by the processor 601.

In a possible implementation, the processing unit 6042 is further configured to compute a tunnel path on the second network slice based on the network layer topology information of the second network slice.

In a possible implementation, the processing unit 6042 is further configured to: when M interfaces of a second link layer topology and M interfaces of a first link layer topology are separately located on M physical interfaces, determine that the link layer topology of the second network slice is included in the link layer topology of the first network slice, where a quantity of all interfaces of the second link layer topology is M, a quantity of all interfaces of the first link layer topology is N, M is less than or equal to N, and M and N are positive integers.

In a possible implementation, the processing unit 6042 is further configured to: determine the first link layer topology when it is determined, based on the second link layer topology information, that the link layer topology of the second network slice is a part of topology in the link layer topology of the first network slice, where the first link layer topology is a topology that is in the link layer topology of the first network slice and that is the same as the link layer topology of the second network slice; and determine the network layer topology information of the second network slice based on the first link layer topology and the network layer topology information of the first network slice, where the network layer topology information of the second network slice is a part that is in the network layer topology information of the first network slice and that corresponds to the first link layer topology.

In a possible implementation, the obtaining unit 6041 is further configured to obtain third link layer topology information corresponding to a third network slice; the processing unit 6042 is further configured to determine, based on the third link layer topology information and the second link layer topology information, that the link layer topology of the second network slice is included in a link layer topology of the third network slice; the receiving unit is further configured to receive network layer topology information that is of the third network slice and that is sent by the second network device; and the processing unit 6042 is further configured to determine, based on the network layer topology information of the third network slice and the network layer topology information of the first network slice, to use the network layer topology information of the first network slice to determine the network layer topology information of the second network slice.

In a possible implementation, the network layer topology information of the first network slice includes topology information determined based on a shortest path algorithm or topology information determined based on FlexAlgo.

In a possible implementation, the network layer topology information of the second network slice includes interior gateway protocol IGP topology information, and the IGP topology information includes one or more items of the following: an IP address, a link cost, a cost value, a latency, a TE metric, an affinity attribute, and an SRLG.

In a possible implementation, the first link layer topology information further includes one or more of an identifier of the first network slice and bandwidth information of the first network slice; and the second link layer topology information further includes one or more of an identifier of the second network slice and bandwidth information of the second network slice.

In a possible implementation, the network device further includes a sending unit; the obtaining unit 6041 is further configured to obtain a path computation requirement of the second network slice; the processing unit 6042 is further configured to perform path computation based on the second link layer topology information and the network layer topology information of the second network slice, to obtain a path computation result; and the sending unit is further configured to send the path computation result to the second network device, where the path computation result is used to indicate the second network device to create a tunnel that carries a service.

In a possible implementation, the path computation result includes one or more items of the following: a path computation result of an RSVP tunnel, a path computation result of an SR TE tunnel, and a path computation result of an SRv6 tunnel.

It may be understood that the receiving unit and a sending function may be implemented by the processor by invoking program code in the memory, and may cooperate with the network interface 602 as required. Alternatively, the network interface 602 on the network device 600 may complete a data transceiving operation.

In various implementations, the network device 600 is configured to perform the communication method provided in embodiments of this disclosure. For example, the processor 601 executes computer-executable instructions in the memory 604, to enable the network device 600 to perform the communication method included in the embodiments corresponding to FIG. 2 to FIG. 5.

The foregoing describes embodiments of this disclosure in detail. The steps in the method of embodiments of this disclosure may be sequentially scheduled, combined, or deleted based on an actual requirement. The modules in the apparatus in embodiments of this disclosure may be divided, combined, or deleted based on an actual requirement.

It should be understood that "an embodiment" or "an embodiment" mentioned in the whole specification does not mean that particular features, structures, or characteristics related to the embodiment are included in at least one embodiment of this disclosure. Therefore, "in an embodiment" or "in an embodiment" appearing throughout the specification does not refer to a same embodiment. In addition, these particular features, structures, or characteristics may be combined in one or more embodiments in any appropriate manner. It should be understood that sequence numbers of the foregoing processes do not mean execution sequences in embodiments of this disclosure. The execution sequences of the processes should be determined based on functions and internal logic of the processes, and should not constitute any limitation on implementation processes of the embodiments of this disclosure.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in embodiments of this disclosure, "B corresponding to A" indicates that B is associated with A, and B may be determined based on A. However, it should be understood that determining B based on A does not mean that B is determined based on only A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this disclosure. The foregoing storage medium includes any medium that can store program code, such as a USB flash drive, a removable hard disk, a read-only memory, a random access memory, a magnetic disk, or an optical disc.

What is claimed is:

1. A communication method, comprising:
   obtaining, by a first network device, first link layer topology information corresponding to a first network slice;

obtaining, by the first network device, second link layer topology information corresponding to a second network slice;

determining, by the first network device based on the first link layer topology information and the second link layer topology information, that a link layer topology of the first network slice comprises a link layer topology of the second network slice;

receiving, by the first network device from a second network device, network layer topology information corresponding to the first network slice; and determining, by the first network device, network layer topology information of the second network slice based on the second link layer topology information and the network layer topology information of the first network slice.

2. The communication method according to claim 1, wherein the method further comprises:

determining, by the first network device, a tunnel path on the second network slice based on the network layer topology information of the second network slice.

3. The communication method according to claim 1, wherein the determining, by the first network device based on the first link layer topology information and the second link layer topology information further comprises:

determining that the link layer topology of the first network slice comprises that the link layer topology of the second network slice when M interfaces of a second link layer topology and M interfaces of a first link layer topology are separately located on M physical interfaces, wherein a quantity of all interfaces of the second link layer topology is M, a quantity of all interfaces of the first link layer topology is N, M is less than or equal to N, and M and N are positive integers.

4. The communication method according to claim 1, wherein the determining, by the first network device, network layer topology information of the second network slice based on the second link layer topology information and the network layer topology information of the first network slice comprises:

determining, by the first network device, the first link layer topology when the first network device determines, based on the second link layer topology information, that the link layer topology of the second network slice is a part of topology in the link layer topology of the first network slice, wherein the first link layer topology is a topology that is in the link layer topology of the first network slice and that is the same as the link layer topology of the second network slice; and determining, by the first network device, the network layer topology information of the second network slice based on the first link layer topology and the network layer topology information of the first network slice, wherein the network layer topology information of the second network slice is a part that is in the network layer topology information of the first network slice and that corresponds to the first link layer topology.

5. The communication method according to claim 1, wherein the network layer topology information of the first network slice comprises topology information determined based on a shortest path algorithm or topology information determined based on a flexible algorithm (FlexAlgo).

6. The communication method according to claim 1, wherein the network layer topology information of the second network slice comprises interior gateway protocol (IGP) topology information, and the IGP topology information comprises one or more items of the following: an internet protocol (IP) address, a link cost value, a latency, a traffic engineering (TE) metric, an affinity attribute, and a shared risk link group (SRLG).

7. The communication method according to claim 1, wherein the method further comprises:

obtaining, by the first network device, a path computation requirement of the second network slice;

performing, by the first network device, path computation based on the second link layer topology information and the network layer topology information of the second network slice, to obtain a path computation result; and sending, by the first network device, the path computation result to the second network device, wherein the path computation result is used to indicate the second network device to create a tunnel that carries a service.

8. The communication method according to claim 7, wherein the path computation result comprises one or more items of the following: a path computation result of a resource reservation protocol (RSVP) tunnel, a path computation result of a segment routing traffic engineering (SR TE) tunnel, and a path computation result of a segment routing Internet protocol version 6 (SRv6) tunnel.

9. An apparatus, wherein the apparatus comprises:

at least one processor;

at least one non-transitory computer-readable storage medium storing a program to be executed by the at least one processor, the program including instructions to cause the apparatus to:

obtain first link layer topology information corresponding to a first network slice;

obtain second link layer topology information corresponding to a second network slice;

determine, based on the first link layer topology information and the second link layer topology information, that a link layer topology of the first network slice comprises a link layer topology of the second network slice; and receive network layer topology information that is sent by a second network device and that is of the first network slice; and determine network layer topology information of the second network slice based on the second link layer topology information and the network layer topology information of the first network slice.

10. The apparatus according to claim 9, wherein the instructions further include instructions to:

determine a tunnel path on the second network slice based on the network layer topology information of the second network slice.

11. The apparatus according to claim 9, wherein the instructions further include instructions to:

when M interfaces of a second link layer topology and M interfaces of a first link layer topology are separately located on M physical interfaces, determine that the link layer topology of the second network slice is comprised in the link layer topology of the first network slice, wherein a quantity of all interfaces of the second link layer topology is M, a quantity of all interfaces of the first link layer topology is N, M is less than or equal to N, and M and N are positive integers.

12. The apparatus according to claim 9, wherein the instructions further include instructions to:

determine the first link layer topology when it is determined, based on the second link layer topology information, that the link layer topology of the second network slice is a part of topology in the link layer topology of the first network slice, wherein the first link layer topology is a topology that is in the link layer topology of the first network slice and that is the same as the link layer topology of the second network slice; and determine the network layer topology information of the second network slice based on the first link layer topology and the network layer topology information of the first network slice, wherein the network layer topology information of the second network slice is a part that is in the network layer topology information of the first network slice and that corresponds to the first link layer topology.

13. The apparatus according to claim 9, wherein the network layer topology information of the first network slice comprises topology information determined based on a shortest path algorithm or topology information determined based on flexible algorithm (FlexAlgo).

14. The apparatus according to claim 9, wherein the network layer topology information of the second network slice comprises interior gateway protocol (IGP) topology information, and the IGP topology information comprises one or more items of the following: an internet protocol (IP) address, a link cost value, a latency, a traffic engineering (TE) metric, an affinity attribute, and a shared risk link group (SRLG).

15. The apparatus according to claim 9, wherein the instructions further include instructions to:
obtain a path computation requirement of the second network slice;
perform path computation based on the second link layer topology information and the network layer topology information of the second network slice, to obtain a path computation result; and
send the path computation result to the second network device, wherein the path computation result is used to indicate the second network device to create a tunnel that carries a service.

16. The apparatus according to claim 15, wherein the path computation result comprises one or more items of the following: a path computation result of a resource reservation protocol (RSVP) tunnel, a path computation result of a segment routing traffic engineering (SR TE) tunnel, and a path computation result of a segment routing Internet protocol version 6 (SRv6) tunnel.

17. A non-transitory storage medium storing a program, which when executed by one or more processors, cause the one or more processors to perform operations, the operations comprising:
obtaining, by a first network device, first link layer topology information corresponding to a first network slice;
obtaining, by the first network device, second link layer topology information corresponding to a second network slice;
determining, by the first network device based on the first link layer topology information and the second link layer topology information, that a link layer topology of the first network slice comprises a link layer topology of the second network slice;
receiving, by the first network device, network layer topology information that for the first network slice and that is sent by a second network device; and
determining, by the first network device, network layer topology information of the second network slice based on the second link layer topology information and the network layer topology information of the first network slice.

18. The non-transitory storage medium according to claim 17, wherein the operations further comprise:
determining, by the first network device, a tunnel path on the second network slice based on the network layer topology information of the second network slice.

19. The non-transitory storage medium according to claim 17, wherein the operations further comprise:
when M interfaces of a second link layer topology and M interfaces of a first link layer topology are separately located on M physical interfaces, determining that the link layer topology of the second network slice is comprised in the link layer topology of the first network slice, wherein a quantity of all interfaces of the second link layer topology is M, a quantity of all interfaces of the first link layer topology is N, M is less than or equal to N, and M and N are positive integers.

20. The non-transitory storage medium according to claim 17, wherein the network layer topology information of the first network slice comprises topology information determined based on a shortest path algorithm or topology information determined based on a flexible algorithm (FlexAlgo).

* * * * *